Figure 1:
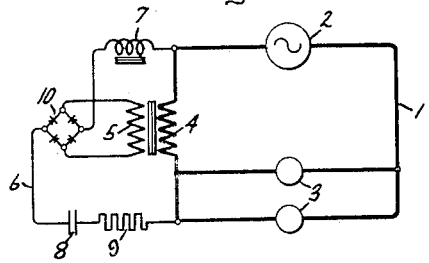

March 27, 1934.   C. G. SUITS   1,952,637
MEANS FOR PRODUCING PULSATIONS IN AN ALTERNATING CURRENT CIRCUIT
Filed Dec. 23, 1932

Inventor:
Chauncey G. Suits,
by Charles E. Mullen
His Attorney.

Patented Mar. 27, 1934

1,952,637

UNITED STATES PATENT OFFICE 1,952,637

MEANS FOR PRODUCING PULSATIONS IN AN ALTERNATING-CURRENT CIRCUIT

Chauncey G. Suits, Schenectady, N. Y., assignor to General Electric Company, a corporation of New York Application December 23, 1932, Serial No. 648,662

16 Claims. (Cl. 171—97)

My invention relates to apparatus for producing pulsations in an alternating-current circuit and particularly to apparatus which is devoid of any moving parts being thereby entirely electrical in its operation. One object of my invention is to provide an improved apparatus of this character which operates in response to voltage variations in the alternating-current circuit arising from the pulsations. A further object of my invention is the provision of such apparatus which is simple in construction, efficient in operation and inexpensive to manufacture.

My invention will be better understood from the following description taken in connection with the accompanying drawing, and its scope will be pointed out in the appended claims.

In the drawing Figs. 1, 2, 3, and 4 are circuit diagrams illustrating various modifications of my invention.

In Fig. 1 I have shown at 1 an alternating-current circuit which is represented as supplied from the source 2 which, for example, may be a 110 volt, 60 cycle source, and connected across the circuit 1 are a plurality of load devices represented at 3, which devices may, for example, be incandescent lamps comprising a sign, field border lamps of an airport, etc. For controlling the current flow in circuit 1 in order to produce the desired pulsations of current therein I employ the saturable core reactor 4 having a saturating winding 5 whereby the impedance of the reactor varies in accordance with the degree of saturation of its core, being small for greater saturation and vice versa. For controlling the saturating current in winding 5 I employ the voltage sensitive resonant circuit 6 which has a non-linear volt-ampere characteristic. This circuit includes the saturable core reactor 7, the capacitor 8, and the resistor 9, and as shown by Fig. 1 is bridged across the reactor 4 whereby it is subject to the potential difference across this reactor. The current supplied to the saturating winding 5 is obtained from the non-linear circuit 6 through the full-wave rectifier 10. In the present case this rectifier is shown as arranged in series in the circuit 6. It may, however, under suitable conditions be connected in shunt with either the capacitor, or the resistor, or the capacitor and a portion of the inductance winding.

In the operation of the apparatus the voltage-sensitive non-linear resonant circuit 6 alternately becomes resonant and non-resonant or dissonant whereby the current supplied to the saturating winding 5 and hence the degree of saturation of the core of reactor 4 is varied accordingly. These variations in the saturation of the core of reactor 4 cause variations in the impedance offered by this reactor which in turn vary the potential difference applied to the non-linear circuit 6. Such variations in potential difference applied to circuit 6 cause it alternately to become resonant and dissonant. As a result the alternating current which flows in circuit 1 undergoes regular recurring variations in mean effective value causing the load lamps 3 to be illuminated or to flash at regular intervals. The pulsation or flashing intervals, it will be understood, are at a relatively low frequency being substantially independent of the frequency of the alternating current and may be varied by suitable variations in the reactor 7, the reactor 4, the capacitor or the resistor.

Figure 2:
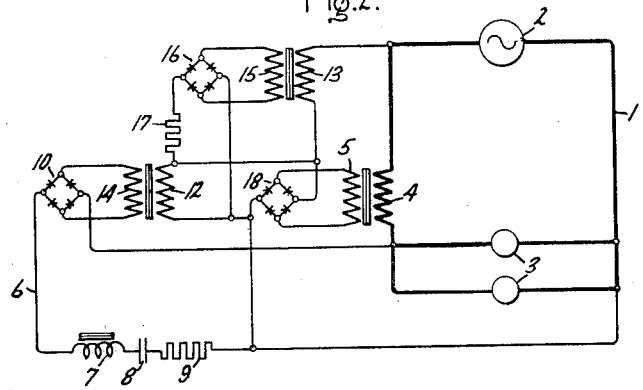

In the form of my invention illustrated by Fig. 2, the main alternating-current circuit 1 is controlled by the saturable core reactor 4 through the voltage sensitive non-linear resonant circuit 6 which in this case connects across the load rather than across the saturable core reactor. The non-linear circuit 6 is represented as including the same elements as the corresponding circuit of Fig. 1. In this case the current supplied to the saturating winding 5 is controlled by the non-linear circuit through the saturable core reactors 12 and 13. Reactor 13 is connected in series with the rectifier 18, while reactor 12 is connected to shunt rectifier 18, the saturating winding 14 of reactor 12 being supplied from the rectifier 10, and the saturating winding 15 of reactor 13 being supplied by the rectifier 16 which connects through resistor 17 across reactor 12. Saturating winding 5 of reactor 4 is supplied by the rectifier 18 which is connected in parallel with reactor 12. As a result of this arrangement the core of reactor 4 undergoes regular recurring variations in saturation whereby this reactor offers corresponding regular recurring variations in the impedance which it offers to current flow in the main circuit 1. The lamps 3 therefore like the corresponding lamps in Fig. 1, undergo regular variations in brilliancy and give an intermittent or flashing effect which as in Fig. 1 is substantially independent of the frequency of the alternating current supplied. An advantage of the circuit shown by Fig. 2 over that shown by Fig. 1 is that there is a greater tendency to maintain a constant maximum lamp voltage in spite of load or supply voltage changes.

Figure 3:
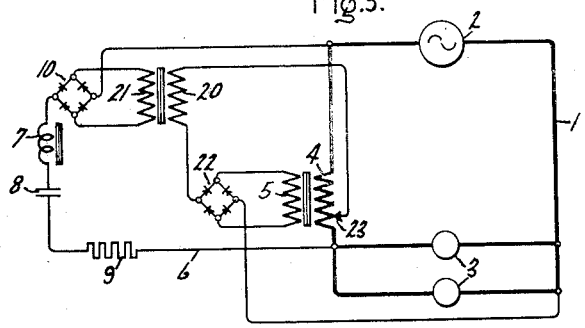

In the modified form shown by Fig. 3, the non-linear resonant circuit 6 is connected to be responsive to potential differences across the reactor 4 as in Fig. 1, but in this arrangement the energy of the non-linear circuit 6 is amplified by the saturable core reactor 20. This reactor has its saturating winding 21 supplied by the non-linear circuit through the rectifier 10 and connects at one end and through the rectifier 22 with one side of the main circuit 1 and connects at the other end with the tap 23 at an intermediate point of the reactor winding. The saturating winding 5 of reactor 4 is supplied from the circuit including reactor 20 through the rectifier 22. By this arrangement it will be seen that the circuit including reactor 20 has applied to it the potential difference across the load 3 plus a fraction of the potential difference across reactor 4. By changing the position of tap 23 the flashing speed may be varied, thereby producing an adjustable effect. An advantage of the arrangement shown by Fig. 3 over that shown by Fig. 1 is that it is somewhat more economical in the case of relatively large loads.

Figure 4:
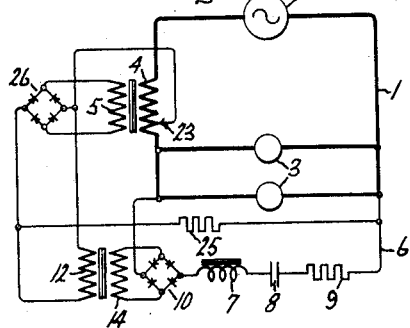

That form of my invention illustrated by Fig. 4 may be regarded as a modification of what is shown in Fig. 2. In this form of my invention I am able to eliminate one of the saturable core reactors and thus simplify the construction. Reactor 12 whose saturating winding 14 is supplied by the non-linear circuit through rectifier 10 connects at one side through resistor 25 with one side of the main circuit and at the other side connects with the tap 23 on the reactor 4. Arranged in shunt with reactor 12 is the rectifier 26 which supplies saturating current to winding 5. In this case it will be seen that the saturating current supplied to winding 5 is dependent first, upon the potential difference across the load and a fraction of reactor 4, and second, upon the degree of saturation of reactor 12. An advantage of this arrangement is that it has substantial freedom from load changes and requires a relatively small amount of equipment.

For the sake of simplicity in the drawing I have shown the various saturable core reactors in a purely diagrammatic manner. In actual construction, however, each of these reactors may, for example, comprise a four-legged core having windings as represented by Fig. 2 of my copending application, Serial No. 582,802, filed December 23, 1931. If preferred each of these reactors may be in the form of two transformers each having its own magnetic circuit, such for example as that shown in Fig. 3 of my above noted copending application.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States, is:

1. Apparatus for producing pulsations in an alternating-current circuit having a load device therein comprising a saturable core reactor device in the resonant circuit and a non-linear circuit operative in response to variations in voltage applied thereto connected across one of said devices to cause variations in the saturation of the core of said reactor.

2. Apparatus for producing pulsations in an alternating-current circuit having a load device therein comprising a saturable core reactor device in said circuit having a saturating winding and a non-linear resonant circuit connected with said winding and across one of said devices to cause variations in the current in said winding in response to voltage variations across said one device.

3. Apparatus for producing pulsations in an alternating-current circuit including a load device comprising a reactor device in said circuit and means entirely electrical in operation for causing a variation in the reactance of said reactor in response to variations in the potential difference across one of said devices.

4. Apparatus for producing pulsations in an alternating-current circuit including a load device comprising a saturable core reactor device in said circuit and means entirely electrical in operation for causing a variation in the saturation of said reactor in response to changes in the potential difference across one of said devices.

5. Apparatus for producing pulsations in an alternating-current circuit including a load device comprising a saturable core reactor device in said circuit having a saturating winding and means all of whose parts are relatively fixed for supplying a variable current to said winding in response to changes in the potential difference across one of said devices.

6. In combination, an alternating-current circuit including a load device and a saturable core reactor device having a saturating winding and a non-linear resonant circuit arranged to control the supply of current to said winding in response to voltage variations across one of said devices.

7. Apparatus for producing pulsations in an alternating-current circuit including a load device comprising a saturable core reactor in the circuit having a saturating winding and a voltage sensitive non-linear resonant circuit connected across said reactor and arranged to control the supply of saturating current to said winding.

8. Apparatus for producing pulsations in an alternating-current circuit including a load device comprising a saturable core reactor in the circuit having a saturating winding, a voltage sensitive non-linear resonant circuit connected across said reactor and means controlled by said non-linear resonant circuit for supplying rectified current to said winding.

9. Apparatus for producing pulsations in an alternating-current circuit comprising a saturable core reactor in the circuit, a shunt circuit including a reactor and a capacitor connected across said reactor and constructed to become resonant at a predetermined applied voltage and means for saturating the core of said reactor in response to the current in said shunt circuit.

10. Apparatus for producing pulsations in an alternating-current circuit comprising a saturable core reactor in the circuit having a saturating winding, a shunt circuit including a reactor, a capacitor and a rectifier connected across said saturable core reactor and constructed to become resonant at a predetermined applied voltage and means for connecting said rectifier with said winding.

11. Apparatus for producing pulsations in an alternating-current circuit including a load comprising a saturable core reactor in said circuit, a non-linear resonant circuit connected across said load, and means responsive to the current variations of said non-linear circuit for varying the saturation of said core.

12. Apparatus for producing pulsations in an alternating-current circuit including a load comprising a saturable core reactor in said circuit having a saturating winding, a non-linear resonant circuit connected across said load, and a rectifier in said non-linear circuit arranged to control said winding.

13. Apparatus for producing pulsations in an alternating-current circuit including a load device comprising a saturable core reactor device in said circuit having a saturating winding, a non-linear resonant circuit connected across one of said devices and amplifying means including a saturable core reactor responsive to the current in said non-linear circuit for controlling the current in said saturating winding.

14. Apparatus for producing pulsations in an alternating-current circuit comprising a saturable core reactor in said circuit, a non-linear resonant circuit including a rectifier connected across said reactor, a circuit derived from said alternating-current circuit and including a second saturable core reactor controlled by said rectifier and means for varying the saturation of said first reactor in response to the current in said derived circuit.

15. Apparatus for producing pulsations in an alternating-current circuit including a load device comprising a saturable core reactor in said circuit, a non-linear resonant circuit connected across said load device, an auxiliary circuit connected across the load device and a portion of said reactor for controlling the saturation of said reactor and a second saturable core reactor responsive to the current in said non-linear circuit for varying the effect of said auxiliary circuit.

16. Apparatus for producing pulsations in an alternating-current circuit including a load device comprising a saturable core reactor in said circuit having a saturating winding, a non-linear resonant circuit connected across said load device, an auxiliary circuit connected across the load device and a portion of said reactor, a rectifier therein connected with said saturating winding, a second saturable core reactor arranged to shunt said rectifier and means for varying the saturation of said second reactor in accordance with the current in the non-linear circuit.

CHAUNCEY G. SUITS.

CERTIFICATE OF CORRECTION.

Patent No. 1,952,637.            March 27, 1934.

CHAUNCEY G. SUITS.

It is hereby certified that error appears in the printed specification of the above numbered patent requiring correction as follows: Page 2, line 65, claim 1, strike out the word "resonant" and insert the same after "non-linear" in same line; and that the said Letters Patent should be read with this correction therein that the same may conform to the record of the case in the Patent Office.

Signed and sealed this 15th day of May, A. D. 1934.

Bryan M. Battey (Seal)            Acting Commissioner of Patents.